United States Patent
Dorovsky et al.

(10) Patent No.: US 9,366,777 B2
(45) Date of Patent: Jun. 14, 2016

(54) MEASUREMENT OF PERMEABILITY IN BOREHOLE IN THE PRESENCE OF MUDCAKE

(75) Inventors: Vitaly N. Dorovsky, Novosibirsk (RU); Evgeny Igorevich Romensky, Novosibirsk (RU); Anton Vladimirovich Sinev, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 615 days.

(21) Appl. No.: 13/578,146

(22) PCT Filed: Sep. 2, 2011

(86) PCT No.: PCT/RU2011/000671
§ 371 (c)(1), (2), (4) Date: Aug. 9, 2012

(87) PCT Pub. No.: WO2013/032355
PCT Pub. Date: Mar. 7, 2013

(65) Prior Publication Data
US 2013/0070561 A1  Mar. 21, 2013

(51) Int. Cl.
*G01V 1/50* (2006.01)
(52) U.S. Cl.
CPC .......... *G01V 1/50* (2013.01); *G01V 2210/1299* (2013.01); *G01V 2210/1429* (2013.01); *G01V 2210/614* (2013.01); *G01V 2210/6246* (2013.01); *G01V 2210/675* (2013.01)
(58) Field of Classification Search
CPC ............ G01V 1/50; G01V 2210/1299; G01V 2210/1429; G01V 2210/614; G01V 2210/6246; G01V 2210/675
USPC ....................................................... 367/25, 35
See application file for complete search history.

(56) References Cited

U.S. PATENT DOCUMENTS

| 4,964,101 A * | 10/1990 | Liu et al. ........................ 367/31 |
| 8,830,787 B2 | 9/2014 | Dorovsky et al. |
| 2006/0039238 A1* | 2/2006 | Mandal et al. ................. 367/31 |

(Continued)

FOREIGN PATENT DOCUMENTS

WO    2007001746 A1    1/2007

OTHER PUBLICATIONS

PCT International Search Report and Written Opinion issued in PCT application No. PCT/RU2011/000671, dated Jul. 31, 2012, 14 pages.

(Continued)

*Primary Examiner* — Daniel L Murphy
(74) *Attorney, Agent, or Firm* — Chowdhury Law Group, P.C.

(57) ABSTRACT

The present disclosure relates to methods and apparatuses for evaluating a porous earth formation. The method may include: generating an acoustic wave in a borehole fluid; measuring an attenuation of the acoustic wave; and estimating a permeability of an earth formation acoustically coupled to the borehole fluid using the estimated attenuation and a theoretical attenuation. The method may also include estimating a theoretical attenuation for the borehole fluid using acoustic properties of the borehole fluid. The apparatus for performing the method may include: an acoustic source, an acoustic sensor, and a processor configured to estimate the attenuation of an acoustic wave generated by the acoustic source.

17 Claims, 6 Drawing Sheets

(56) References Cited

U.S. PATENT DOCUMENTS

2009/0145600 A1* 6/2009 Wu et al. .................. 166/250.02
2009/0168598 A1* 7/2009 Wu et al. .......................... 367/35

OTHER PUBLICATIONS

N. Akbar, J. Dvorkin, and A. Nur, "Relating P-wave attenuation to permeability," Geophysics, Jan. 1993, pp. 20-29, vol. 58, No. 1, Society of Exploration Geophysicists.

D. Appelo and G. Kreiss, "A new absorbing layer for elastic waves," Journal of Computational Physics, 2006, pp. 642-660, vol. 215, No. 2, Elsevier, Inc.

G.A. Maximov and M.E. Merkulov, "Effects of a mudcake on the propagation of Stoneley waves in a borehole," Acoustical Physics, 2002, pp. 187-200, vol. 48, No. 2.

A.M. Blokhin and V.N. Dorovsky, Mathematical Modeling in the Theory of Multivelocity Continuum, 1995, 191 pages, Nova Science Publishers, Commack, New York.

S.K. Godunov and E.I. Romenskii, Elements of Continuum Mechanics and Conservation Laws, 2002, 266 pages, Kluwer Academic/Plenum Publishers, New York.

E.F. Toro, Riemann Solvers and Numerical Methods for Fluid Dynamics: A Practical Introduction, 2nd. ed., 1999, 644 pages, Springer, New York.

V.N. Dorovsky, E.I. Romensky, A.I. Fedorov, and Y.V. Perepechko, "A resonance method for measuring permeability," Russian Geology and Geophysics, 2011, pp. 745-752, No. 52, Elsevier, Inc.

E.F. Toro, Riemann Solvers and Numerical Methods for Fluid Dynamics: A Practical Introduction, 3rd. ed., 2009, 737 pages, Springer, New York.

\* cited by examiner

MEASUREMENT OF PERMEABILITY IN BOREHOLE IN THE PRESENCE OF MUDCAKE

BACKGROUND OF THE DISCLOSURE

1. Field of the Disclosure

This disclosure generally relates to exploration and production of hydrocarbons involving investigations of regions of an earth formation penetrated by a borehole. More specifically, the disclosure relates to the characterizing the earth formation using a logging tool in the borehole.

2. Description of the Related Art

The exploration for and production of hydrocarbons may involve a variety of techniques for characterizing earth formations. Drilling boreholes in earth formations may lead to the build-up on impermeable substances, such as mudcake, on borehole walls. The impermeable medium may separate the borehole fluid from the porous earth formation that may be of interest. The impermeable medium may also reduce accuracy of permeability measurements of the earth formation using techniques commonly used in the field of hydrocarbon exploration and production.

Acoustic borehole logging instruments are used to measure velocities of earth formations in one or more modes of acoustic energy propagation. Acoustic borehole logging instruments are typically used in liquid-filled boreholes drilled through the earth formations. Velocity may be generally determined using these instruments by measuring the time taken by an acoustic energy pulse to traverse a particular distance along the wall of the wellbore. The wall forms the interface between the liquid in the wellbore and the earth formations.

SUMMARY OF THE DISCLOSURE

In view of the foregoing, the present disclosure is directed to a method and apparatus for estimating a permeability of an earth formation using one or more acoustic waves in a borehole penetrating the earth formation.

One embodiment according to the present disclosure includes a method of estimating a permeability of an earth formation, comprising: generating at least one acoustic wave in a borehole fluid acoustically coupled to the earth formation; measuring an attenuation of the at least one acoustic wave over time in the borehole fluid using an acoustic sensor; and estimating the permeability using the attenuation over time and at least one theoretical attenuation over time.

Another embodiment according to the present disclosure includes an apparatus for estimating a permeability of an earth formation, comprising: an acoustic source configured to generate at least one acoustic wave in a borehole fluid; an acoustic sensor configured to generate a signal indicative of the attenuation of at least one acoustic wave; and at least one processor configured to: estimate the permeability using the attenuation and at least one theoretical attenuation over time.

Another embodiment according to the present disclosure includes a computer-readable medium product having instructions thereon that, when executed, cause at least one processor to perform a method, the method comprising: estimating the permeability using an attenuation over time of at least one acoustic wave generated in a borehole fluid and at least one theoretical attenuation over time, wherein the borehole fluid is acoustically coupled to an earth formation.

BRIEF DESCRIPTION OF THE DRAWINGS

The present disclosure is best understood with reference to the accompanying figures in which like numerals refer to like elements and in which like numerals refer to like elements and in which.

DETAILED DESCRIPTION OF THE DISCLOSURE

In the disclosure that follows, in the interest of clarity, not all features of actual implementations are described. It will of course be appreciated that in the development of any such actual implementation, as in any such project, numerous engineering and technical decisions must be made to achieve the developers' specific goals and subgoals (e.g., compliance with system and technical constraints), which will vary from one implementation to another. Moreover, attention will necessarily be paid to proper engineering and programming practices for the environment in question. It will be appreciated that such development efforts may be complex and time-consuming, outside the knowledge base of typical laymen, but would nevertheless be a routine undertaking for those of ordinary skill in the relevant fields.

To measure permeability of a porous earth formation through an impermeable medium, such as mudcake, it may be necessary to address measurement difficulties due to the presence of the impermeable medium. Permeability measurements may be performed using one or more acoustic waves in the borehole fluid. The one or more acoustic waves may include one or more radial waves.

One aspect of an acoustic wave may include a dependence of the relative velocities of the earth formation matrix and formation fluid upon permeability of the porous medium at the interface between the two media (the borehole fluid and the earth formation). Having measured the relative velocity at the interface between the media on the side of the borehole, the earth formation permeability may be estimated based on this dependence.

In the presence of an impermeable medium, for example, mudcake, the dependence of the relative velocity upon earth formation permeability may remain valid between the earth formation and mudcake, which may not be directly measurable on the side of the borehole (at the interface between mudcake and borehole fluid). However, since the relative velocity in the earth formation beyond the borehole retains its dependence upon earth formation permeability, it may also cause fast attenuation of borehole fluid waves. Thus, the dependence upon earth formation permeability may serve as a tool for measuring earth formation permeability in the presence of mudcake.

Figure 1:
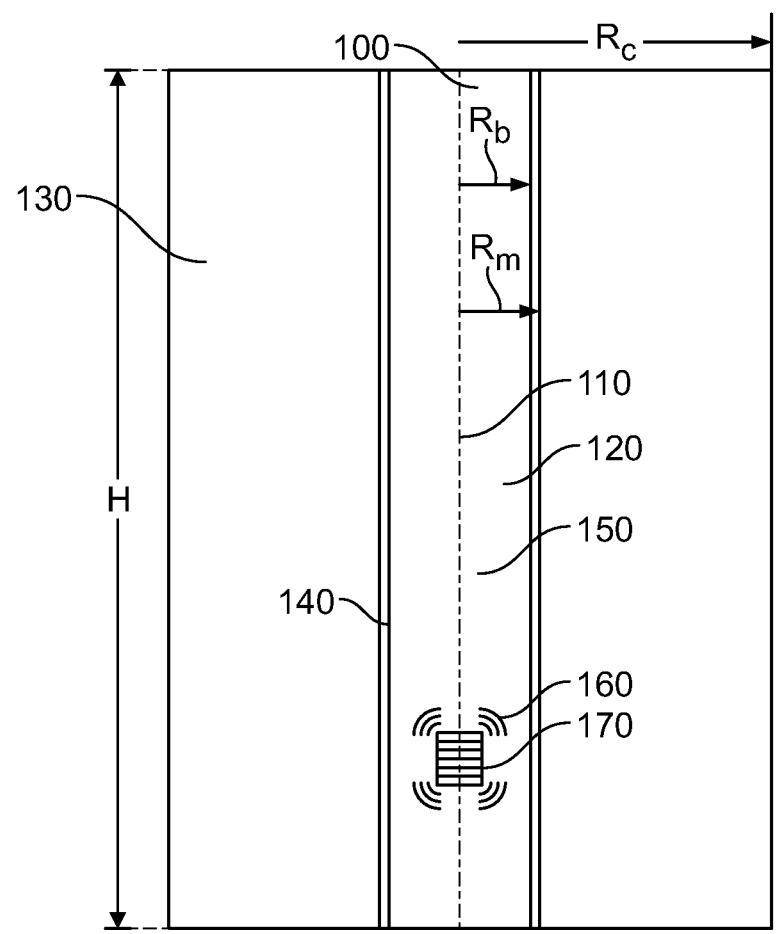
FIG. 1 is a schematic an acoustic model of a borehole penetrating an earth formation according to one embodiment of the present disclosure.

The propagation of waves generated by an acoustic source may be modeled for a borehole in an earth formation as a set of concentric cylinders. FIG. 1 shows an earth formation/borehole model with a height H and radius $R_c$. The borehole with a $R_b$ may penetrate through the center of the earth formation cylinder. In this example, the borehole axis 100 coincides with the axis 110 of the earth formation cylinder. Between the borehole 120 and the earth formation cylinder 130, there may be a thin cylindrical layer 140 representing the impermeable medium in the model such as a mudcake layer. The radius of the interface between the earth formation and the impermeable medium may be $R_m$. The borehole 120 may be filled with a borehole fluid 150, which may be identical to the fluid saturating the porous earth formation 130. The impermeable medium 140 may include mudcake, which may be impermeable for the borehole fluid 150 and may adhere tightly to the surface of the earth formation 130, and which may prevent fluid flow from the porous medium 130 into the borehole 120.

In the model, behavior of acoustic waves 160 generated by an acoustic source 170 may be described by: (i) acoustic equations for borehole fluid 150, (ii) linearized two-velocity equations for the saturated porous medium 130, and (iii) linear equations for the Maxwell visco-elastic medium for mudcake 140. The borehole fluid 150 may be expressed in terms of:

$$\frac{\partial \rho_{00} v_r}{\partial t} + \frac{\partial p}{\partial r} = 0, \frac{\partial \rho_{00} v_z}{\partial t} + \frac{\partial p}{\partial z} = 0,$$

$$\frac{\partial p}{\partial t} + \frac{\partial}{\partial r}(\rho_{00} c^2 v_r) + \frac{\partial}{\partial z}(\rho_{00} c^2 v_z) = -\frac{\rho_{00} c^2 v_r}{r},$$

where $v_r$, $v_z$ are velocities along the axes r, z, p is pressure, $\rho_{00}$ is density, t is time, and c is the velocity of sound.

The visco-elastic mudcake 140 may be expressed in terms of:

$$\rho_e \frac{\partial w_r}{\partial t} - \frac{\partial \sigma_{rr}}{\partial r} - \frac{\partial \sigma_{rz}}{\partial z} = \frac{2\mu_e}{r}(\varepsilon_{rr} - \varepsilon_{\varphi\varphi}),$$

$$\rho_e \frac{\partial w_z}{\partial t} - \frac{\partial \sigma_{rz}}{\partial r} - \frac{\partial \sigma_{zz}}{\partial z} = \frac{2\mu_e}{r}\varepsilon_{rz},$$

$$\frac{\partial \varepsilon_{rr}}{\partial t} - \frac{\partial w_r}{\partial r} = -\frac{1}{\tau}\left(\varepsilon_{rr} - \frac{\varepsilon_{rr} + \varepsilon_{\varphi\varphi} + \varepsilon_{zz}}{3}\right),$$

$$\frac{\partial \varepsilon_{\varphi\varphi}}{\partial t} = \frac{w_r}{r} - \frac{1}{\tau}\left(\varepsilon_{\varphi\varphi} - \frac{\varepsilon_{rr} + \varepsilon_{\varphi\varphi} + \varepsilon_{zz}}{3}\right),$$

$$\frac{\partial \varepsilon_{zz}}{\partial t} - \frac{\partial w_z}{\partial z} = -\frac{1}{\tau}\left(\varepsilon_{zz} - \frac{\varepsilon_{rr} + \varepsilon_{\varphi\varphi} + \varepsilon_{zz}}{3}\right),$$

$$\frac{\partial \varepsilon_{rz}}{\partial t} - \frac{1}{2}\frac{\partial w_z}{\partial r} - \frac{1}{2}\frac{\partial w_r}{\partial z} = -\frac{1}{\tau}\varepsilon_{rz},$$

where $w_r$, $w_z$ are velocities along the axes r, z, $\sigma_{rr}$, $\sigma_{rz}$, $\sigma_{zz}$ zz are stresses related to elastic deformations $\varepsilon_{rr}$, $\varepsilon_{rz}$, $\varepsilon_{zz}$, $\varepsilon_{\varphi\varphi}$ via the Hooke law:

$$\sigma_{rr}=(\lambda_e+2\mu_e)\varepsilon_{rr}+\lambda_e\varepsilon_{\varphi\varphi}+\lambda_e\varepsilon_{zz}, \sigma_{rz}=2\mu_e\varepsilon_{rz}, \sigma_{zz}=\lambda_e\varepsilon_{rr}+\lambda_e\varepsilon_{\varphi\varphi}+(\lambda_e 2\mu_e)\varepsilon_{zz},$$

where $\lambda_e$, $\mu_e$ are the Lamé constants, $\rho_e$ is density, and $\tau$ is relaxation time for tangential stress.

The earth formation 130 may be expressed in terms of:

$$\frac{\partial}{\partial t}(\rho_s u_r + \rho_l v_r) + \frac{\partial}{\partial r}(p + h_{rr}) + \frac{\partial}{\partial z}h_{rz} = -(h_{rr} - h_{\varphi\varphi})/r,$$

$$\frac{\partial}{\partial t}(\rho_s u_z + \rho_l v_z) + \frac{\partial}{\partial r}h_{rz} + \frac{\partial}{\partial z}(p + h_{zz}) = -h_{rz}/r,$$

$$\frac{\partial}{\partial t}\rho_s(u_r - v_r) + \frac{\partial}{\partial r}h_{rr} + \frac{\partial}{\partial z}h_{rz} = -(h_{rr} - h_{\varphi\varphi})/r - \rho_0\rho_l\chi(u_r - v_r),$$

$$\frac{\partial}{\partial t}\rho_s(u_z - v_z) + \frac{\partial}{\partial r}h_{rz} + \frac{\partial}{\partial z}h_{zz} = h_{rz}/r - \rho_0\rho_l\chi(u_z - v_z),$$

$$\frac{\partial}{\partial t}\rho/\rho_0 + \frac{\partial}{\partial r}(\rho_s u_r + \rho_l v_r)/\rho_0 + \frac{\partial}{\partial z}(\rho_s u_z + \rho_l v_z)/\rho_0 =$$
$$-(\rho_s u_r + \rho_l v_r)/\rho_0/r,$$

$$\frac{\partial \varepsilon_{rr}}{\partial t} - \frac{\partial u_r}{\partial r} = 0, \frac{\partial \varepsilon_{\varphi\varphi}}{\partial t} = \frac{u_r}{r}, \frac{\partial \varepsilon_{zz}}{\partial t} - \frac{\partial u_z}{\partial z} = 0,$$

$$\frac{\partial \varepsilon_{rz}}{\partial t} - \frac{1}{2}\frac{\partial u_z}{\partial r} - \frac{1}{2}\frac{\partial u_r}{\partial z} = 0,$$

where $\rho$ is the deviation of the mix density from its initial equilibrium value, $\rho_0$, $\rho_s=(1-\Phi)\rho_s^f, \rho_l=\Phi\rho_l^f$ are partial densities of the elastic skeleton and saturating fluid, $\Phi$ is the porosity, $\rho_s^f, \rho_l^f$ are mass densities of the elastic skeleton and saturating fluid, $\rho_0=\rho_s+\rho_l$ is full density of the mix; $u_r$, $u_z$ are velocities of the elastic skeleton along the axes r, z, $v_r$, $v_z$ are velocities of the saturating fluid along the axes r,z; $\varepsilon_{rr}$, $\varepsilon_{zz}$, $\varepsilon_{rz}$, $\varepsilon_{\varphi\varphi}$ is the elastic skeleton deformation tensor; p is pressure, $h_{rr}$, $h_{zz}$, $h_{rz}$, $h_{\varphi\varphi}$ is the stress tensor linked to density and deformation tensor as follows:

$$p = K(\varepsilon_{rr} + \varepsilon_{zz} + \varepsilon_{\varphi\varphi}) + (K + \rho_0^3\alpha_3)\frac{\rho}{\rho_0},$$

$$h_{rr} = -(\lambda + 2\mu)\varepsilon_{rr} - \lambda\varepsilon_{\varphi\varphi} - \lambda\varepsilon_{zz} - K\frac{\rho}{\rho_0},$$

$$h_{\varphi\varphi} = -\lambda\varepsilon_{rr} - (\lambda + 2\mu)\varepsilon_{\varphi\varphi} - \lambda\varepsilon_{zz} - K\frac{\rho}{\rho_0},$$

$$h_{rr} = -\lambda\varepsilon_{rr} - \lambda\varepsilon_{\varphi\varphi} - (\lambda + 2\mu)\varepsilon_{zz} - K\frac{\rho}{\rho_0},$$

$$h_{rz} = -2\mu\varepsilon_{rz}.$$

where K, $\lambda$, $\mu$, $\alpha_3$ are the constants for the sample material (the earth formation 130); $\chi$ is the interphase friction coefficient.

At the boundaries between borehole fluid 150, mudcake 140, and earth formation 130, the following conditions are true:

For the borehole fluid-mudcake interface, there is continuity of the radial velocity such that $v_r=w_r$, continuity of radial stress such that $p=-\sigma_{rr}$; and substantially no tangential stress at the interface $\sigma_{rz}=0$.

For the mudcake—earth formation interface there is mass flow balance through the boundary (where it may be assumed that boundary velocity coincides with velocity of elastic skeleton) such that $\rho_e w_r=\rho_l v_r+(\rho_e-\rho_l)u_r$, continuity of the radial stress such that $$-\sigma_{rr} = \frac{\rho_l}{\rho}p + \frac{\rho_s}{\rho}p + h_{rr},$$

continuity of the partial stress for the earth formation 130 and the mudcake 140 such that $$-(1-\Phi)\sigma_{rr} = \frac{\rho_s}{\rho}p + h_{rr},$$

continuity of the tangential stress at the interface such that $h_{rz}=-\sigma_{rz}$, and continuity of the velocity along the interface (no-slip condition) such that $w_z=u_z$.

The boundary conditions for the open boundaries may include:
at z=H:
borehole fluid
p=0, no external pressure,
mudcake
$\sigma_{zz}=0$, $\sigma_{rz}=0$, no normal or tangential stress,
earth formation (saturated porous medium)
$p/\rho_0+h_{zz}=0$, $h_{rz}=0$, $u_z-v_z=0$, no normal or tangential stress, and no fluid flow through the surface of the porous medium.
at r=$R_c$:
earth formation (saturated porous medium)
$p/\rho_0+h_{rr}=0$, $h_{rz}=0$, $u_r-v_r=0$, no normal or tangential stress, and no fluid flow through the surface of the porous medium r=$R_c$.

The bottom boundary of the computation domain z=0 is the symmetry surface where the following boundary conditions are true:
for the borehole fluid,—$v_z=0$,
for the mudcake—$w_z=0$, $\sigma_{rz}=0$, and for the earth formation $u_z$, $h_{rz}=0$, $v_z=0$.

The source of wave excitation 170 in the fluid may be modeled as a cylinder with: (i) an axis that coincides with the borehole axis 100, (ii) a radius that may be shorter than the borehole radius $R_b$, (iii) a height that may vary in the range of 0 to H. The bottom surface of the cylinder may be set arbitrarily in any point. Oscillations may be excited by setting a pressure pulse p(t) at the source boundary. When the pressure pulse is turned off, it may be assumed that the source boundary may be a rigid wall where the condition of no normal velocity is true, $v_n=0$.

Attenuation of the pressure pulse may be a result of a continual generation of wave propagating from the borehole fluid 150 into remote portions of the earth formation 130. Thus, dependence of the increment of pressure pulse attenuation in the borehole as a function of permeability of the porous medium may be estimated.

Figure 2:
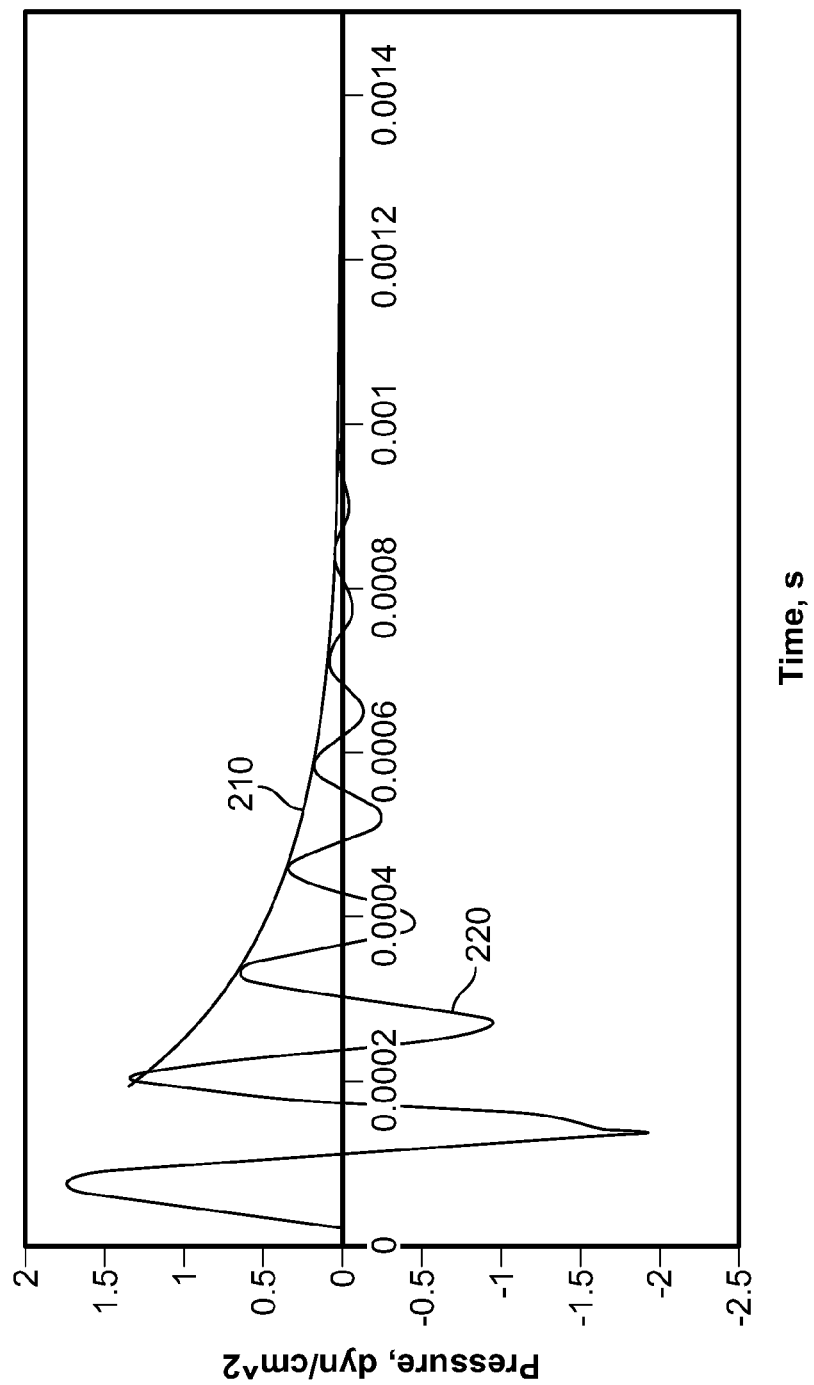
FIG. 2 is a graph of an acoustic attenuation in accordance with the model in one embodiment of the present disclosure.

FIG. 2 shows a curve 210 representing the character of pressure attenuation in the borehole due to the initial acoustic pulse (shown as curve 220) exciting the radial waves for 0.1 cm mudcake and 1 mD permeability of the porous medium. The changes in pressure with time may be expressed in this example as $e^{-5142.8t}$.

Figure 3:
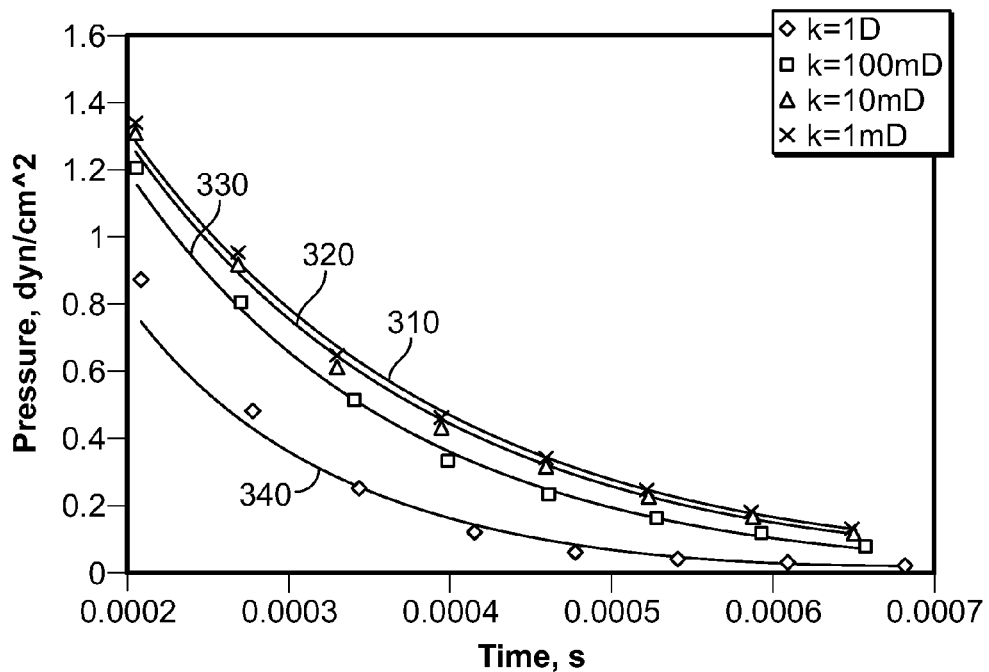
FIG. 3 is a graph of acoustic attenuations for several permeabilities at a mudcake thickness of 0.1 cm in accordance with the model in the present disclosure.
Figure 4:
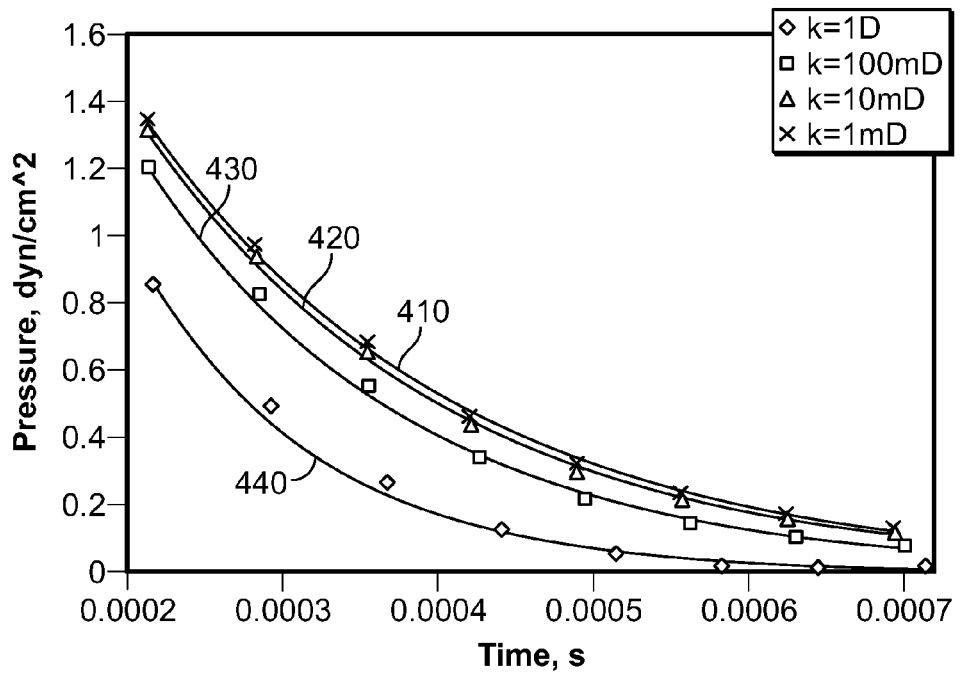
FIG. 4 is a graph of acoustic attenuations for several permeabilities at a mudcake thickness of 0.3 cm in accordance with the model in the present disclosure.

FIGS. 3 and 4 show a set of curves representing the exponential dependence of pressure attenuation in the borehole for four values of permeability of the porous medium and two values of mudcake thickness. FIG. 3 shows curves representing approximations of the pressure maxima by exponents $e^{-\alpha t}$, for permeabilities k=1 mD 310, 10 mD 320, 100 mD 330, and 1 D 340 with a mudcake thickness 0.1 cm. FIG. 4 shows curves representing approximations of the pressure maxima by exponents $e^{-\alpha t}$ for permeabilities k=1 mD 410, 10 mD 420, 100 mD 430, and 1 D 440 with a mudcake thickness 0.3 cm.

Figure 5:
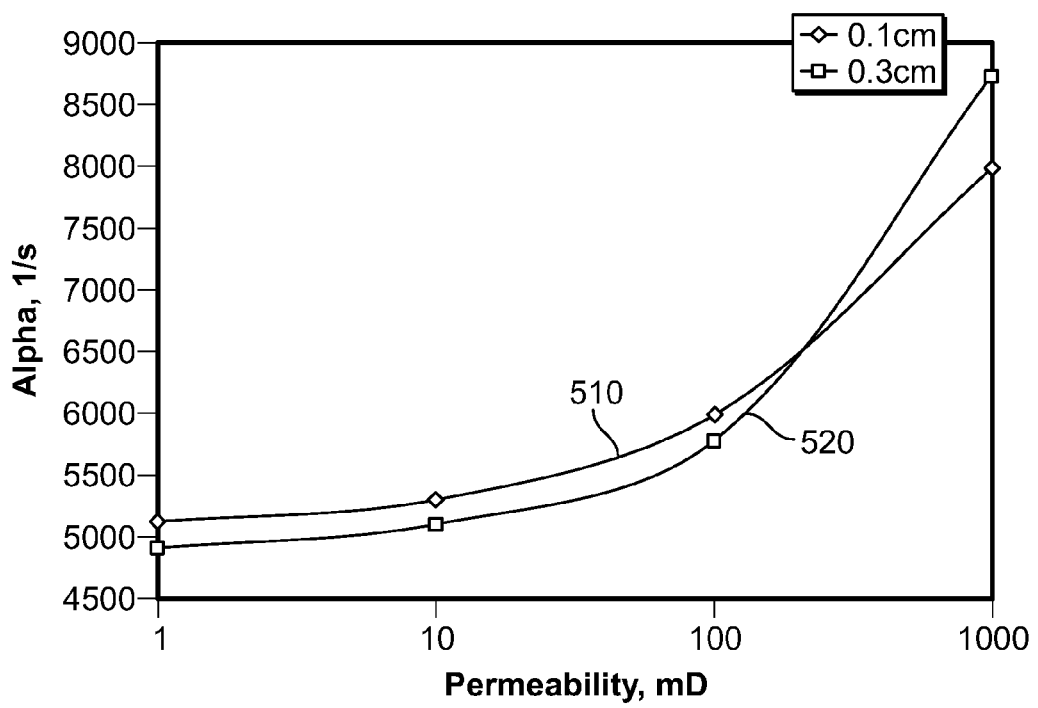
FIG. 5 is a graph of acoustic attenuations for different mudcake thicknesses according the model in the present disclosure.

FIG. 5 shows a comparison between the FIGS. 3 and 4 of the exponent's power index $\alpha$ as a function of formation permeability for mudcake thicknesses 0.1 cm 510 and 0.3 cm 520.

The model may be generated using material parameters found in realistic hydrocarbon exploration and production environments. For one non limiting example, curves 340 and 440 may be generated using the following parameters:
borehole fluid:
density of 1.0 g/cm$^3$, and velocity of sound of 1.5 km/s;
mudcake:
density of 1.1 g/cm$^3$, compressional velocity of 1.5 km/s, shear velocity of 0.32 km/s km/s;
saturated porous medium:
skeleton density of 2.5 g/cm$^3$, saturating fluid density of 1.0 g/cm$^3$, velocity of fast compressional waves 3.5 km/s km/s, velocity of slow compressional waves of 1.2 km/s, velocity of shear waves of 2.4 km/s km/s, and porosity of 0.2.
acoustic source configuration:
At the initial moment of the process at the source-fluid interface, pressure in fluid was set as a time function: $p=p(t)=p_0 \sin(10^4 \pi t)$, $t<1.2 \cdot 10^{-4}$ s. After the influence of the pressure pulse ended, the source boundary was considered a rigid wall with the boundary condition $v_r=0$.

Thus, with information about the exponent's power index for pressure attenuation with time and characteristics of the medium, such as density, porosity, and three acoustic velocities, the earth formation permeability may be estimated with and without mudcake between the borehole fluid and the earth formation. Illustrative embodiments of the present claimed subject matter are described in detail below.

Figure 6:
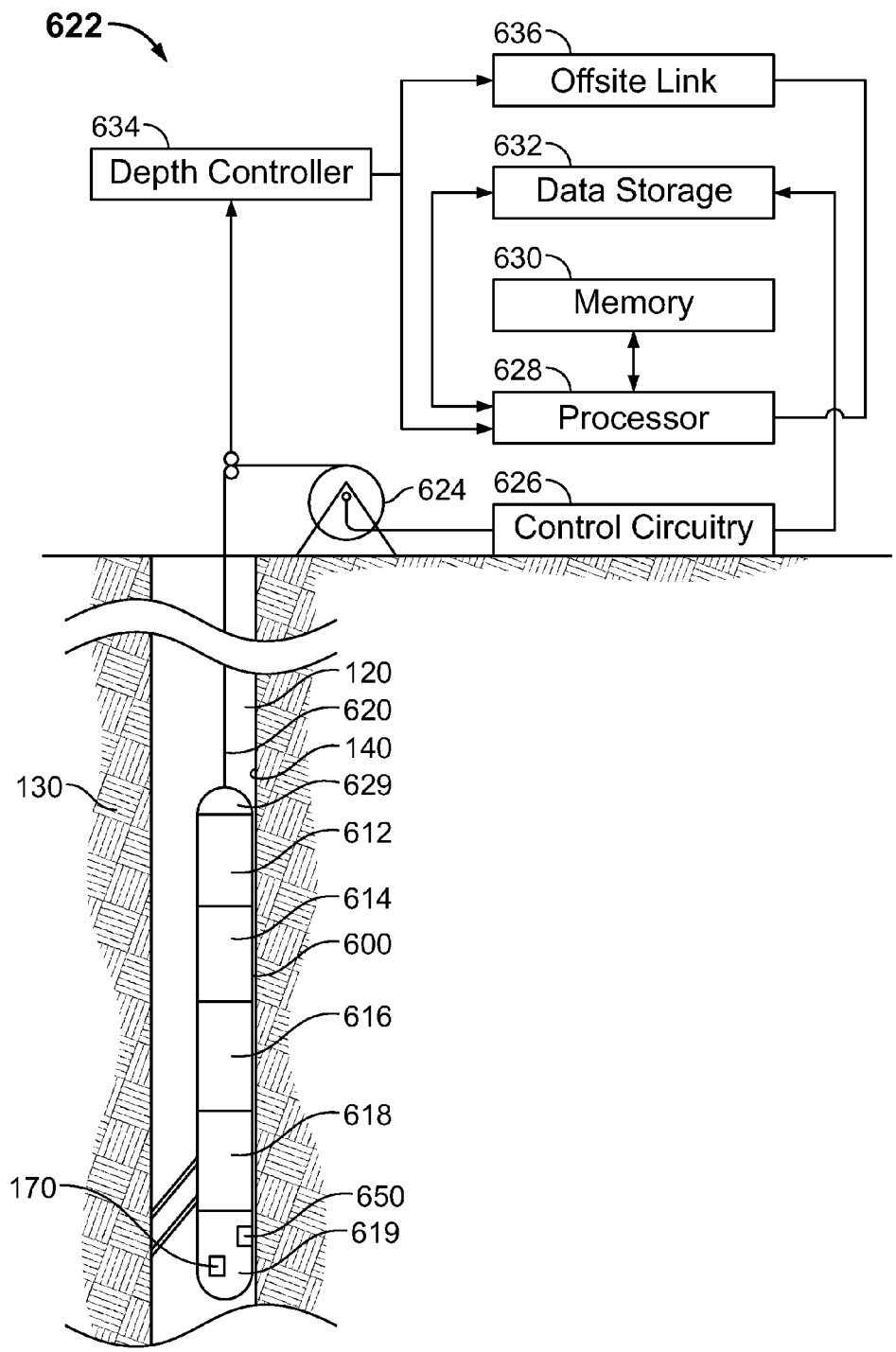
FIG. 6 is a schematic of an acoustic tool in a borehole according to one embodiment of the present disclosure.

A typical configuration of a logging system for implementing the disclosure above is shown in FIG. 6. This is a modification of an arrangement from U.S. Pat. No. 4,953,399 to Fertl et al., having the same assignee as the present disclosure, the contents of which are incorporated herein by reference. Shown in FIG. 6 is a suite of logging instruments 600, disposed within a borehole 120 penetrating an earth formation 130, illustrated in vertical section, and coupled to equipment at the earth's surface, in accordance with various illustrative embodiments of the method and apparatus of the present disclosure. Logging instrument suite 600 may include a resistivity device 612, a natural gamma ray device 614, an acoustic device 619 and/or two porosity-determining devices, such as a neutron device 616 and/or a density device 618. Collectively, these devices and others used in the borehole for logging operations are referred to as formation evaluation sensors. The resistivity device 612 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present disclosure, the contents of which are fully incorporated herein by reference, may be used. The natural gamma ray device 614 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 616 may be one of several types known to the art for using the response characteristics of the formation to neutron radiation to determine formation porosity. Such a device is essentially responsive to the neutron-moderating properties of the formation. The density device 618 may be a conventional gamma-gamma density instrument such as that described in U.S. Pat. No. 3,321,625 to Wahl, used to determine the bulk density of the formation. The acoustic device 619 may include an acoustic source 170 and an acoustic sensor 650. The acoustic sensor 650 may be configured to generate a signal in response to acoustic waves 160. The generated signal of the acoustic sensor 650 may be indicative of an attenuation of acoustic waves 160. A downhole processor 629 may be provided at a suitable location as part of the instrument suite.

The logging instrument suite 600 is conveyed within borehole 120 by a cable 620 containing electrical conductors (not illustrated) for communicating electrical signals between the logging instrument suite 600 and the surface electronics, indicated generally at 622, located at the earth's surface. The logging devices 612, 614, 616, and/or 618 within the logging instrument suite 600 are cooperatively coupled such that electrical signals may be communicated between each of the logging devices 612, 614, 616, and/or 618 and the surface electronics 622. The cable 620 is attached to a drum 624 at the earth's surface in a manner familiar to the art. The logging instrument suite 600 is caused to traverse the borehole 120 by spooling the cable 620 on to or off of the drum 624, also in a manner familiar to the art.

The surface electronics 622 may include such electronic circuitry as is necessary to operate the logging devices 612, 614, 616, and/or 618 within the logging instrument suite 600 and to process the data therefrom. Some of the processing may be done downhole. In particular, the processing used for making decisions on speeding up (discussed below) or slowing down the logging speed may be performed downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision making is carried out.

Control circuitry 626 contains such power supplies as are required for operation of the chosen embodiments of logging devices 612, 614, 616, and/or 618 within the logging instrument suite 600 and further contains such electronic circuitry as is necessary to process and normalize the signals from such logging devices 612, 614, 616, and/or 618 in a conventional manner to yield generally continuous records, or logs, of data pertaining to the formations surrounding the borehole 120. These logs may then be electronically stored in a data storage device 632 prior to further processing. A surface processor 628 may process the measurements made by the formation evaluation sensor(s) 612, 614, 616, 619, and/or 618. This processing could also be done by the downhole processor 629.

The surface electronics 622 may also include such equipment as will facilitate machine implementation of various illustrative embodiments of the method of the present disclosure. The surface processor 628 may be of various forms including, but limited to, an appropriate digital computer programmed to process data from the logging devices 612, 614, 616, 619, and/or 618. A memory unit 630 and the data storage unit 632 are each of a type to interface cooperatively with the surface processor 628 and/or the control circuitry 626. A depth controller 634 determines the longitudinal movement of the logging instrument suite 600 within the borehole 120 and communicates a signal representative of such movement to the surface processor 628. The logging speed is altered in accordance with speedup or slowdown signals that may be communicated from the downhole processor 629, and/or provided by the surface processor 628, as discussed below. This is done by altering the rotation speed of the drum 624. Offsite communication may be provided, for example, by a satellite link, by a telemetry unit 636.

Figure 7:
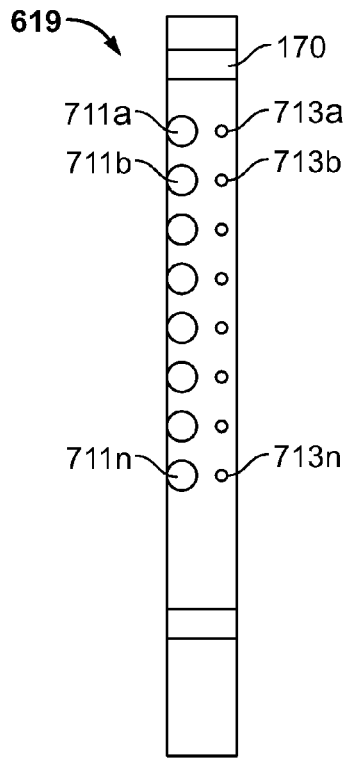
FIG. 7 is a schematic of the acoustic tool according to one embodiment of the present disclosure.

FIG. 7 shows an exemplary logging tool 619 according to the present disclosure. This includes an acoustic source 170, a plurality of acoustic sensors 650 such as hydrophones 711a, 711b . . . 711n and associated electrodes 713a, 713b . . . 713n. The acoustic source 170 may be a monopole source so as to increase the excitation of Stoneley waves in the borehole (not shown in FIG. 7).

Figure 8:
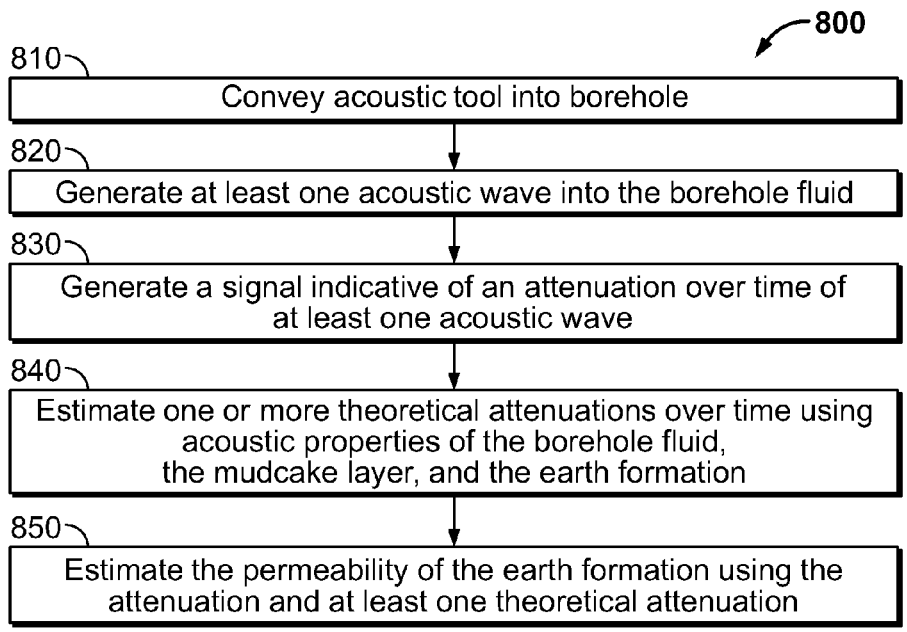
FIG. 8 is a flow chart of a method according to one embodiment of the present disclosure.

Embodiments of the apparatus according to the present disclosure may be used to perform a method. FIG. 8 shows a flow chart for one embodiment of the method 800. In step 810, the tool 619 may be conveyed in borehole 120. In step 820, at least one acoustic wave may be generated in the borehole fluid 150. The at least one acoustic wave may include, but is not limited to, a radial wave. The borehole fluid 150 may be acoustically coupled to the earth formation 130. The acoustic coupling may be direct or indirect. In step 830, an acoustic sensor 650 may generate a signal indicative of an attenuation of the at least one acoustic wave over time in the borehole fluid 150. In step 840, one or more theoretical attenuations over time may be estimated using acoustic properties of the borehole fluid 150, the mudcake layer 140, and the earth formation 130. The acoustic properties may include, but are not limited to, one or more of: (i) porosity, (ii) density, and (iii) sound velocity. In step 850, the permeability of the earth formation may be estimated using the attenuation over time and at least one theoretical attenuation over time. In some embodiments, an optional step (not shown) may include estimating permeability using an interpolation between two theoretical attenuations.

Implicit in the processing of the data is the use of a computer program implemented on a suitable machine readable medium that enables the processor to perform the control and processing. The machine readable medium may include ROMs, EPROMs, EAROMs, Flash Memories and Optical disks. The determined formation permeabilities may be recorded on a suitable medium and used for subsequent processing upon retrieval of the BHA. The determined formation permeabilities may further be telemetered uphole for display and analysis.

As described herein, the method in accordance with the presently disclosed embodiment of the disclosure involves several computational steps. As would be apparent by persons of ordinary skill, these steps may be performed by computational means such as a computer, or may be performed manually by an analyst, or by some combination thereof. As an example, where the disclosed embodiment calls for selection of measured values having certain characteristics, it would be apparent to those of ordinary skill in the art that such comparison could be performed based upon a subjective assessment by an analyst or by computational assessment by a computer system properly programmed to perform such a function. To the extent that the present disclosure is implemented utilizing computer equipment to perform one or more functions, it is believed that programming computer equipment to perform these steps would be a matter of routine engineering to persons of ordinary skill in the art having the benefit of the present disclosure.

Implicit in the processing of the acquired data is the use of a computer program implemented on a suitable computational platform (dedicated or general purpose) and embodied in a suitable machine readable medium that enables the processor to perform the control and processing. The term "processor" as used in the present disclosure is intended to encompass such devices as microcontrollers, microprocessors, field-programmable gate arrays (FPGAs) and the storage medium may include ROM, RAM, EPROM, EAROM, solid-state disk, optical media, magnetic media and other media and/or storage mechanisms as may be deemed appropriate. As discussed above, processing and control functions may be performed downhole, at the surface, or in both locations.

Although a specific embodiment of the disclosure as well as possible variants and alternatives thereof have been described and/or suggested herein, it is to be understood that the present disclosure is intended to teach, suggest, and illustrate various features and aspects of the disclosure, but is not intended to be limiting with respect to the scope of the disclosure, as defined exclusively in and by the claims, which follow.

While the foregoing disclosure is directed to the specific embodiments of the disclosure, various modifications will be apparent to those skilled in the art. It is intended that all such variations within the scope of the appended claims be embraced by the foregoing disclosure.

What is claimed is:

1. A method of estimating a permeability of an earth formation, comprising:
   generating at least one radial acoustic wave in a borehole fluid acoustically coupled to the earth formation;
   measuring an attenuation of the at least one radial acoustic wave over time in the borehole fluid using an acoustic sensor; and
   estimating the permeability using the attenuation over time and at least one theoretical attenuation over time.

2. The method of claim 1, further comprising:
   estimating the at least one theoretical attenuation using acoustic properties of the borehole fluid, a mudcake layer, and the earth formation.

3. The method of claim 2, wherein the acoustic properties include at least one of: (i) density, (ii) porosity, and (iii) sound velocity.

4. The method of claim 1, wherein the at least one theoretical attenuation over time includes a plurality of theoretical attenuations over time; the method further comprising:
   estimating the permeability by interpolating between two of the plurality of theoretical attenuations.

5. The method of claim 1, wherein the borehole fluid is acoustically coupled to the earth formation by an impermeable medium.

6. The method of claim 1, using an acoustic source to generate the at least one acoustic wave.

7. The method of claim 1, wherein the at least one theoretical attenuation over time is obtained modeling a source of excitation of the at least one radial acoustic wave as a cylinder having an axis that coincides with an axis of a borehole, the borehole being formed in the earth formation and containing the borehole fluid.

8. The method of claim 1, wherein the at least one theoretical attenuation over time is obtained using (i) acoustic equations for the borehole fluid, (ii) linearized two-velocity equations for the earth formation, and (iii) linear equations for a Maxwell visco-elastic medium for a mudcake layer.

9. An apparatus for estimating a permeability of an earth formation, comprising:
   an acoustic source configured to generate at least one radial acoustic wave in a borehole fluid;
   an acoustic sensor configured to generate a signal indicative of the attenuation of at least one radial acoustic wave; and
   at least one processor configured to:
      estimate the permeability using the attenuation and at least one theoretical attenuation over time.

10. The apparatus claim 9, the at least one processor further configured to:
    estimate the theoretical attenuation using acoustic properties of the borehole fluid, a mudcake layer, and the earth formation.

11. The apparatus of claim 10, wherein the acoustic properties include at least one of: (i) density, (ii) porosity, and (iii) sound velocity.

12. The apparatus of claim 9, wherein the at least one theoretical attenuation over time includes a plurality of theoretical attenuations over time; and the at least one processor further configured to:
    estimate the permeability by interpolating between two of the plurality of theoretical attenuations.

13. The apparatus of claim 9, wherein the borehole fluid is acoustically coupled to the earth formation by an impermeable medium.

14. The apparatus of claim 9, wherein the at least one theoretical attenuation over time is obtained modeling a source of excitation of the at least one radial acoustic wave as a cylinder having an axis that coincides with an axis of a borehole, the borehole being formed in the earth formation and containing the borehole fluid.

15. The apparatus of claim 9, wherein the at least one theoretical attenuation over time is obtained using (i) acoustic equations for the borehole fluid, (ii) linearized two-velocity equations for the earth formation, and (iii) linear equations for a Maxwell visco-elastic medium for a mudcake layer.

16. A computer-readable medium product having instructions thereon that, when executed, cause at least one processor to perform a method, the method comprising:
    estimating permeability using an attenuation over time of at least one radial acoustic wave generated in a borehole fluid and at least one theoretical attenuation over time, wherein the borehole fluid is acoustically coupled to an earth formation.

17. The computer-readable medium product of claim 16 further comprising at least one of: (i) a ROM, (ii) an EPROM, (iii) an EEPROM, (iv) a flash memory, or (v) an optical disk.

* * * * *